(12) United States Patent
Kao et al.

(10) Patent No.: US 7,172,329 B2
(45) Date of Patent: Feb. 6, 2007

(54) BACK LIGHT MODULE (75) Inventors: Hung-Chen Kao, Taipei (TW); Hsin-Chieh Lai, Hsinchu (TW)

(73) Assignee: Hannstar Display Corporation, Taoyuan (TW)

( * ) Notice: Subject to any disclaimer, the term of this patent is extended or adjusted under 35 U.S.C. 154(b) by 116 days.

(21) Appl. No.: 10/907,190

(22) Filed: Mar. 24, 2005

(65) Prior Publication Data
US 2006/0098459 A1    May 11, 2006

(30) Foreign Application Priority Data
Nov. 5, 2004    (TW)    ............................. 93133757 A (51) Int. Cl.
*F21V 7/04* (2006.01)
(52) U.S. Cl. ................................. 362/633
(58) Field of Classification Search ........ 362/614–615, 362/611, 632–634, 558; 349/57–60
See application file for complete search history.

(56) References Cited
U.S. PATENT DOCUMENTS
7,036,973 B2 *    5/2006    Jeong ........................ 362/633
7,070,315 B2 *    7/2006    Choi ........................... 362/628

* cited by examiner

*Primary Examiner*—Renee Luebke
*Assistant Examiner*—Julie A. Shallenberger
(74) *Attorney, Agent, or Firm*—Jianq Chyun IP Office (57) ABSTRACT

The present invention provides a back light module, having an optical element, a light source and an outer supporting means. The optical element includes main body and protrusions which protrude from an edge of the main body. Contiguous protrusions with the main body form a positioning groove. The conjunction region between protrusion and main body is a fillet. The outer supporting means fixes the optical elements and the light source, which has at least one positioning component disposed on the edge of the back plate. The positioning component includes one inner wall near to edge of the main body, a side wall near to the protrusion and a transition wall connecting the side wall and the inner wall. A separate distance g between the fillet and the side wall so that the optical element can be prevented from cracking during the impact or shock test of the back light module.

20 Claims, 7 Drawing Sheets

BACK LIGHT MODULE

CROSS-REFERENCE TO RELATED APPLICATION

This application claims the priority benefit of Taiwan application serial no. 93133757, filed on Nov. 5, 2004.

BACKGROUND OF THE INVENTION

1. Field of Invention

The present invention relates to a planar light source, and particularly to a back light module.

2. Description of Related Art

Today, the digital appliances, such as a mobile phone, a digital camera, a digital video camera, a notebook, a personal computer (PC) and a desktop, have been developed tremendously with more convenience, multi-function and attractive outlook. To use such so-called IT (information technology) products, the screen is indispensable for man-machine interface with more convenient maneuver. Recently the liquid crystal display (LCD) has been the major type of screen for most of the mobile phone, the digital camera, the digital video camera, the notebook, the personal computer and the desktop. However the liquid crystal display itself is incapable of emitting light, so that it needs to use a back light module under the liquid crystal display as the light source for display purpose.

Figure 1:
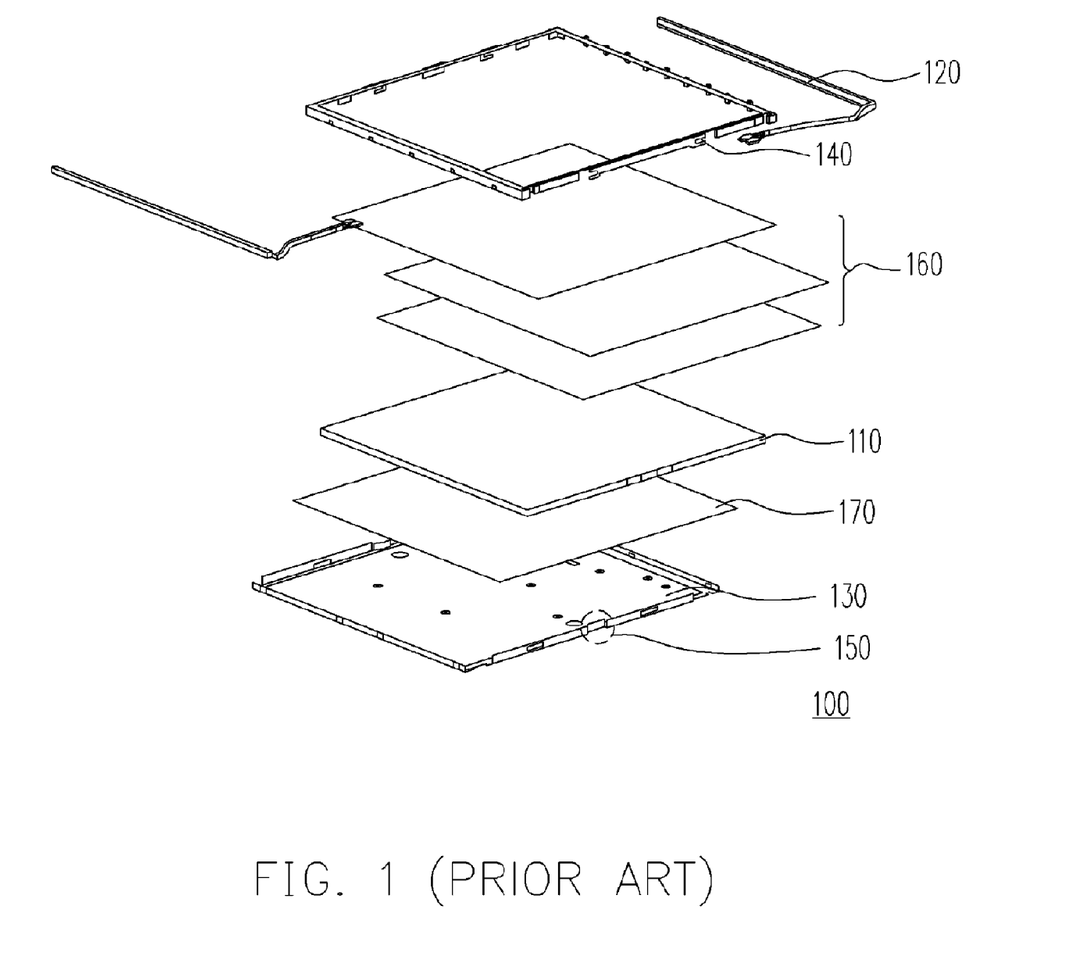
FIG. 1 illustrates an exploded drawing, schematically illustrating a conventional back light module.

FIG. 1 illustrates an exploded drawing of the conventional back light module. In FIG. 1, the back light module 100 includes an optical element 110, a light source 120, a back plate 130, a front frame 140, a plurality of optical films 160 and a reflection sheet 170. Wherein, the light source 120 is disposed approach, including beside or underneath, to the optical element 110. The optical element 110 can be a light guide plate (LGP) or a diffusion sheet. The front frame 140 is used for fixing the optical element 110 and the light source 120 onto the back plate 130. In addition, the back plate 130 supports the optical element 110, the light source 120, the optical films 160 and the reflection sheet 170. In the conventional back light module 100, the optical element 110, the light source 120, the optical films 160 and the reflection sheet 170 are fixed by the front frame 140 and the back plate 130 is used to provide a stable planar light source. Generally, at least one positioning component 150 is usually implemented on the periphery of the back plate 130 for conveniently positioning and assembling optical element 110.

Figure 2A:
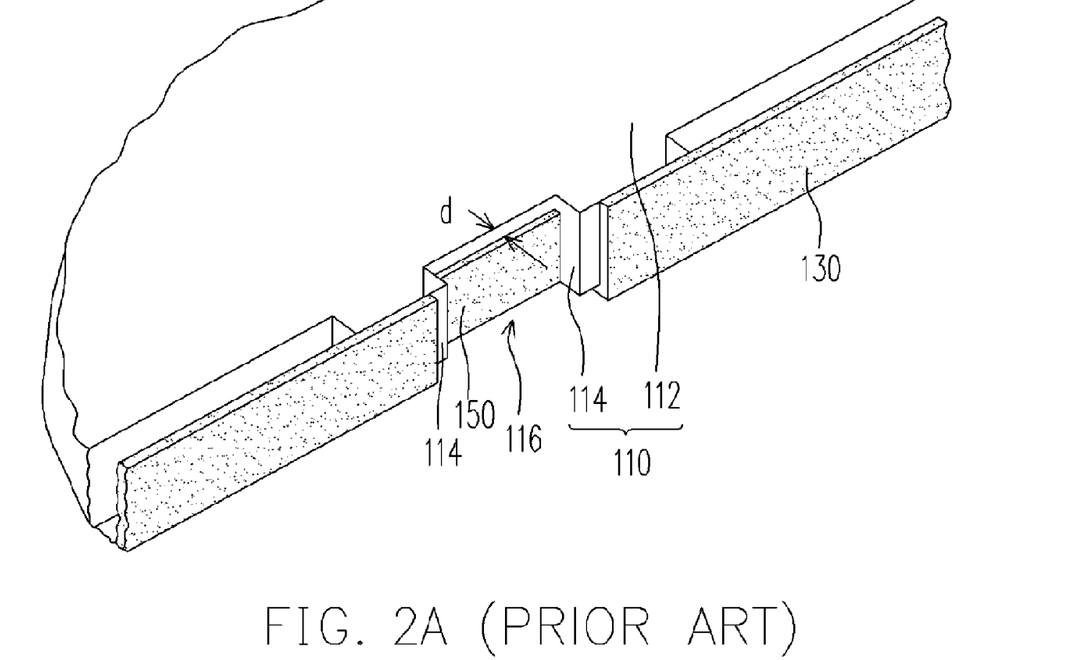
FIG. 2A is a perspective view, schematically illustrating assembly of the conventional back light module.
Figure 2B:
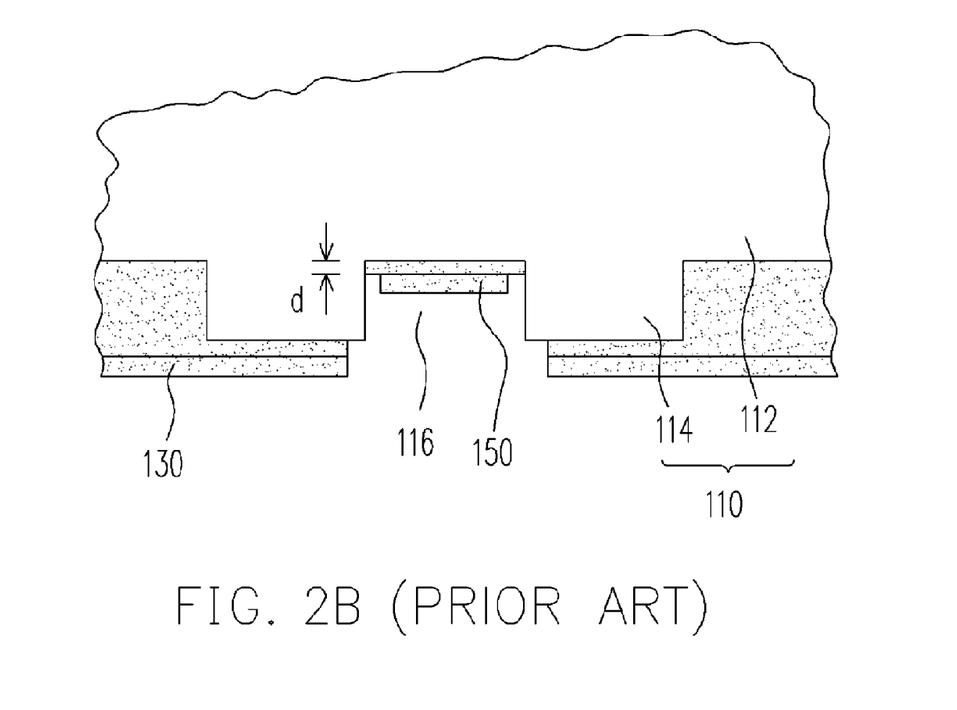
FIG. 2B is a planar view, schematically illustrating the conventional back light module.

FIG. 2A and FIG. 2B are drawings, schematically showing assembly view and plane view respectively. Here, the optical element 110 includes a main body 112 and a plurality of protrusions 114 wherein two contiguous protrusions 114 and the main body 112 form a positioning groove 116. The positioning component 150 is usually formed by cutting a region of the bottom of the back plate 130 and bending the region up. The positioning component 150 is used to fix the optical element 110 to a position in the back light module to prevent a shifting of the optical element 110 from occurring. In addition, the separate distance gap d between the positioning groove 116 of the optical element 110 and the positioning component 150 is designed as 0.2–0.5 mm approximately for precisely positioning and preventing the optical element 110 from big shift during test or usage. In order to prevent a crack caused by the stress concentration in a corner of the light guide plate during a shock or impact test, it is effective to design a fillet on the corner. But in consideration of practice to open the molding, the fillet radius is larger than 0.7 mm as preferred. Therefore, an excessive small separate distance d is not allowed to form the round fillet at the positioning groove 116 of the optical element 110.

Generally, the impact or shock test must be taken for the liquid crystal display or the liquid crystal panel no matter when in the stage of manufacturing or developing, so that both of manufacturers and customers can evaluate its reliability. However, with the recently lunched liquid crystal display in bigger size, the weight gets larger, accordingly. The stress concentration is more likely occurring at the sharp corners of positioning groove 116 under impact exerted on the positioning component 150, and then causes cracking at the right-angle corner. As a result, the crack on the positioning component 150 causes the poor display quality of the liquid crystal display and people need to handle with such problem by improving design.

SUMMARY OF THE INVENTION

It is the object of the invention to provide a back light module to prevent the optical element from cracking during the impact or shock test and enhance the display quality of the liquid crystal display.

According to the above-mentioned objects and the others, the invention provides a back light module, which comprises an optical element, a light source and an outer supporting means. Therein, the optical element includes a main body and a plurality of protrusions. The protrusions outthrust from an edge of the main body, two contiguous protrusions and the main body form a positioning groove, and the conjunction area between each protrusion and the main body is a fillet. The light source is disposed near to the optical element, and the outer supporting means is used for fixing the optical elements and the light source. Wherein, the outer supporting means has at least one positioning component. The positioning component includes an inner wall, two side walls, and two transition walls. The inner wall is near to the edge of the main body and the side walls are near to the protrusion. Moreover, each of the transition walls is coupled between one of the side walls and the inner wall, and there is a separate distance gap g between the fillet and the side walls.

In accordance with a back light module of the invention, the above-mentioned outer supporting means can include a back plate and a front frame. The back plate supports both of a light guide plate and a light source, and the front frame fixes both of the light guide plate and the light source onto the back plate. The back plate can be made of metal or plastic with thickness of r. The curvature radius of each fillet takes R, and R is equal to thickness r plus separate distance g. Normally, the curvature radius R takes 0.5–1.5 mm, thickness r takes 0.3–1.0 mm and separate distance g takes 0.2–0.5 mm. In addition, the first separate distance d1 between the side walls and the one of the protrusions near to the side wall can take 0.1–0.3 mm, with regard to a second separate distance d2 between the main body and the inner wall takes 0.2–0.5 mm.

In accordance with a back light module of the invention, the protrusions can take form of rectangle or trapezoid, and the included angle between the inner wall and the side wall can take a right angle or obtuse angle. The back plate can also have an outer wall near to the protrusions. Moreover, the protrusions can outthrust from the outer wall. Also and the protrusion can also outburst from the side walls. The side wall is in conjunction with the outer wall, and there is a third separate distance d3 between the inner wall and the outer wall. There is a fourth separate distance d4 between the side wall and the outer wall.

In accordance with a back light module of the invention, the optical element can be a light guide plate or a diffusion sheet. The back light module further includes a light source, which can be a cold cathode fluorescent lamp (CCFL) or a light emitting diode (LED).

Further, in the optical element of the present invention, the conjunction area between the protrusions and the main body is a fillet with a separate distance g from the side wall of the positioning component. Due to the foregoing design of the present invention, the optical element can be prevented effectively from cracking caused by stress concentration during the impact or shock test and the quality of the liquid crystal display can be enhanced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 3:
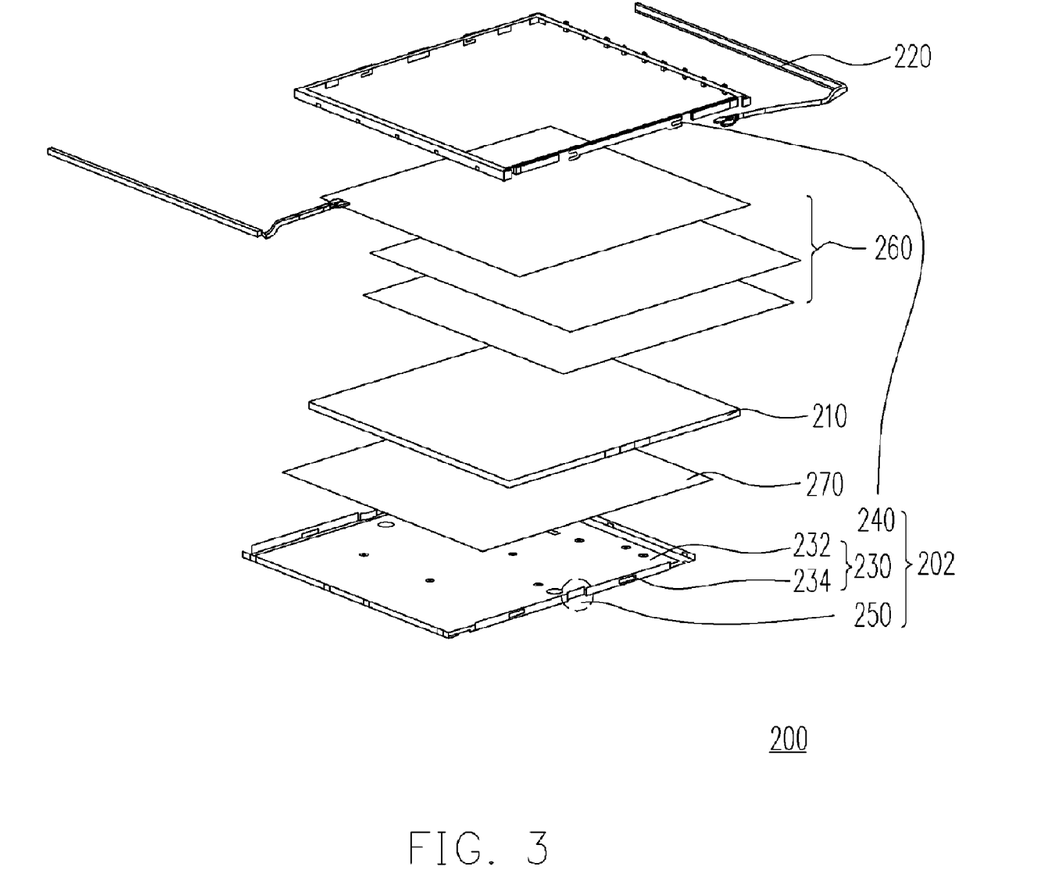
FIG. 3 is a drawing, schematically illustrating an exploded view of a back light module, according to a first embodiment of the present invention.

FIG. 3 is a drawing, schematically illustrating an exploded view of a back light module, according to a first embodiment of the present invention. The back light module 200 includes an optical element 210, a light source 220, an outer supporting means 202, a plurality of optical films 260 and a reflection sheet 270. The outer supporting means 202 is used to fix the optical element 210 and the light source 220. In addition, the outer supporting means 202 can include a back plate 230, a front frame 240, one or more positioning components 250. The light source 220 is disposed approach, including beside or underneath, to the optical element 210. The optical element 210 can be a light guide plate or a diffusion sheet. The back plate 230 supports the optical element 210 and the light source 220. The light source 220 can be a cold cathode fluorescent lamp or light emitting diode. In addition, the front frame 240 is used for fixing the optical element 210 and the light source 220 onto the back plate 230. The optical films 260 are located over the optical element 210 to enhance optical quality of the back light module 200. Further, the positioning component 250 is disposed at an edge of the back plate 230 to keep the optical element 210 from position shift. The back plate 230 includes a body plate 232 and an outer wall 234, wherein the outer wall 234 is coupled to the edge of the body plate 232. Preferably, the outer wall 234 is formed by bending an edge of the back plate 230. In addition, the outer supporting means 202 can be made of metal or plastic.

Figure 4A:
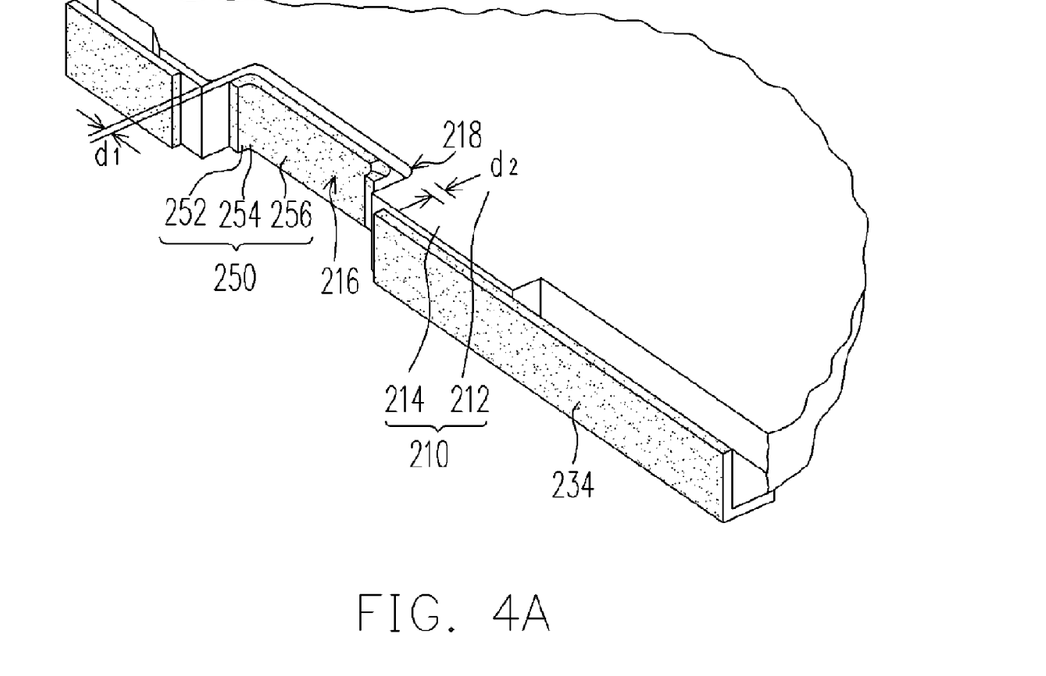
FIG. 4A is a perspective view, schematically illustrating the assembly of the positioning component, according to the first embodiment of the present invention.
Figure 4B:
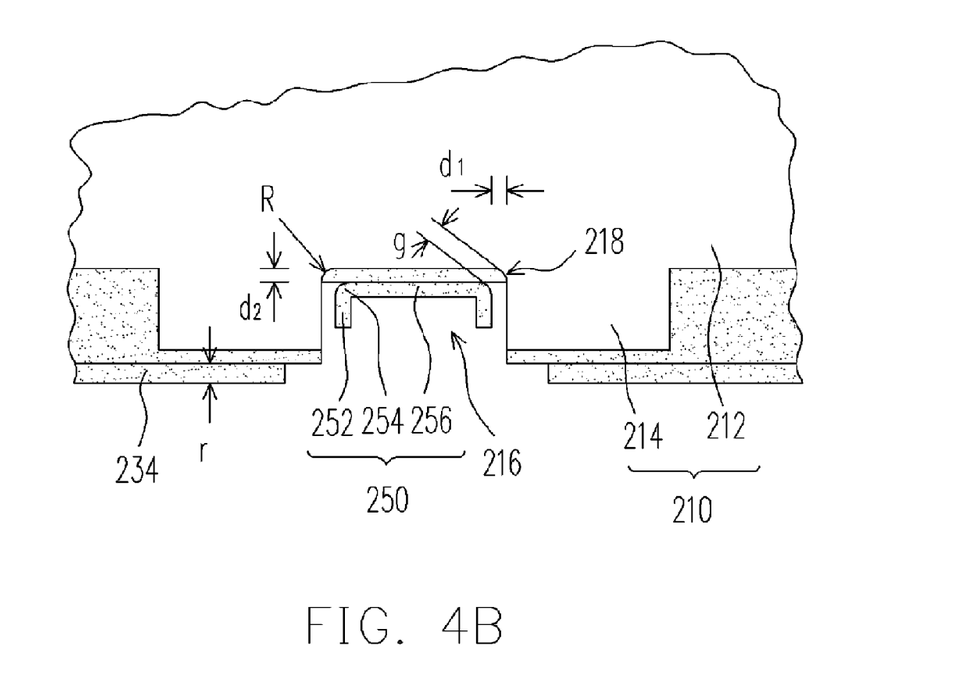
FIG. 4B is a planar view, schematically illustrating the positioning component, according to the first embodiment of the present invention.

FIG. 4A and FIG. 4B are a perspective view and a planar view, schematically illustrating the assembly of the positioning component, according to the first embodiment of the present invention. In FIG. 4A and FIG. 4B, the optical element 210 here includes a main body 212 and a plurality of protrusions 214 wherein the protrusions 214 take form rectangle and outthrust from an edge of the main body 212, and can keep an appropriate distance from the outer wall 234 and the side wall 252. The protrusions 214 protrude from the outer wall 234 and the side wall 252. Two contiguous protrusions 214 and the main body 212 form a positioning groove 216, and the conjunction area between each protrusion 214 and the main body 212 is a fillet 218. Moreover, the positioning component 250 includes an inner wall 256, two side walls 252 and two transition walls 254. The positioning component 250 is formed by cutting a region of the back plate 230, and thereby bending the region. The side walls 252 are formed by bending the edges of the positioning component 250. The transition walls 254 are formed automatically during forming the side walls 252. Wherein, the separate distance d1 between the side wall 252 and an edge of the protrusion 214 is preferably about 0.1–0.3 mm, the separate distance d2 between the main body 212 and the inner wall 256 takes preferably about 0.2–0.5 mm. In addition, each transition wall 254 is in conjunction with both of the side wall 252 and the inner wall 256, and the separate distance g between the transition wall 254 and the fillet 218 is preferably about 0.2–0.5 mm. If thickness r of the back plate is within 0.3–1.0 mm, then the curvature radius R of the fillet 218 has a relationship with the separate distance g and thickness r of the back plate by R=r+g. In this consideration, the curvature radius R preferably is 0.5–1.5 mm. In this embodiment, the included angle between the inner wall 256 and the side wall 252 takes a right angle, and the outer wall 234 is separate from the side wall 252 of the positioning component 250.

However, the protrusions 214 of the optical element 210 can also take other form, not be limited to the above-mentioned rectangle protrusion. In addition, the outer wall 234 can also be designed in conjunction with the side wall 252 of the positioning component 250. Hereafter, the invention is described more particularly by two more preferred embodiments shown in the accompanying drawings.

Figure 5A:
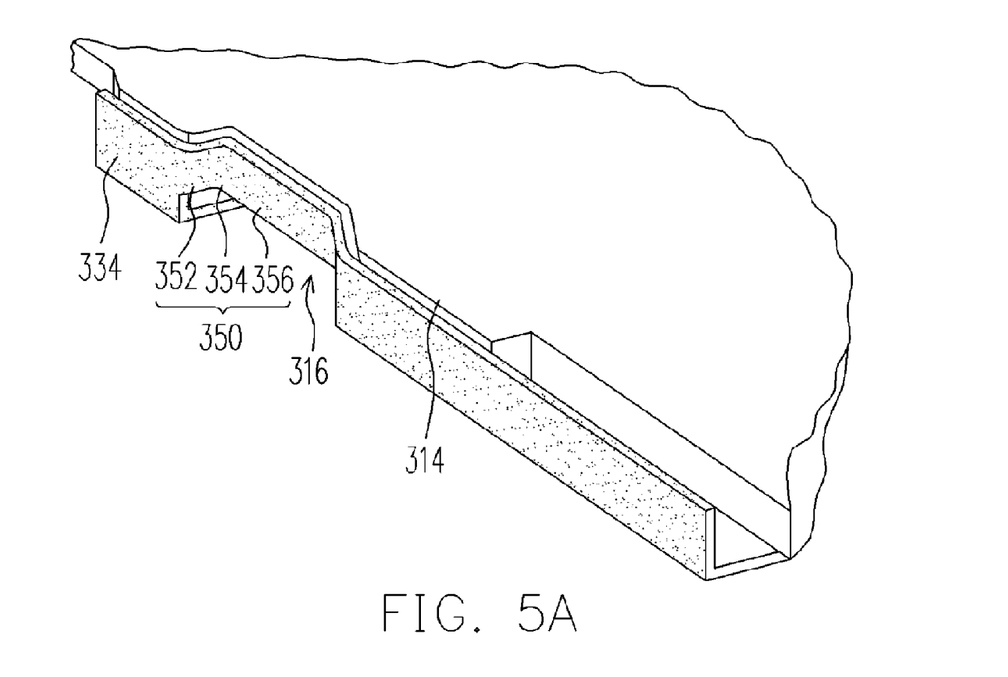
FIG. 5A is a perspective view, schematically illustrating the assembly of the positioning component, according to a second embodiment of the present invention.
Figure 5B:
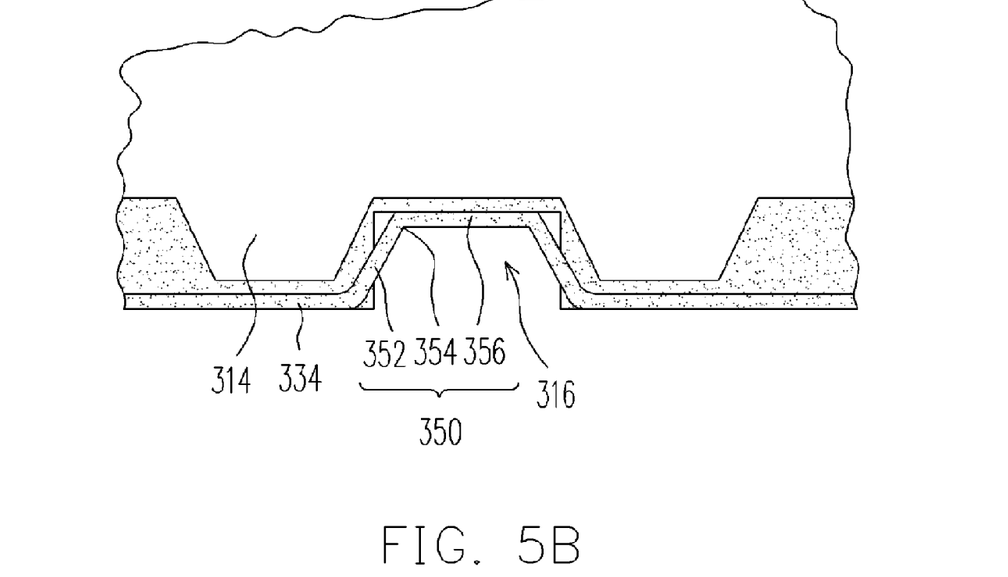
FIG. 5B is a planar view, schematically illustrating the positioning component, according to the second embodiment of the present invention.

FIGS. 5A–5B are perspective and planar views, schematically illustrating the assembly of the positioning component, according to a second embodiment of the present invention. In FIGS. 5A and 5B, the protrusion 314 takes trapezoid form and the included angle between the inner wall 356 and the side wall 352 is an obtuse angle. In this embodiment, the outer wall 334 is in conjunction with the side wall 352 of the positioning component 350. Preferably, the out wall 334 is formed by bending an edge of the back plate and the positioning component 350 is formed by cutting a region of the back plate, and thereby bending another region of the outer wall 334. Wherein, the side walls 352 and the transition walls 354 are formed automatically during forming the positioning component 350. The protrusions 314 are covered by the outer wall 334 and the side wall 352.

Figure 6A:
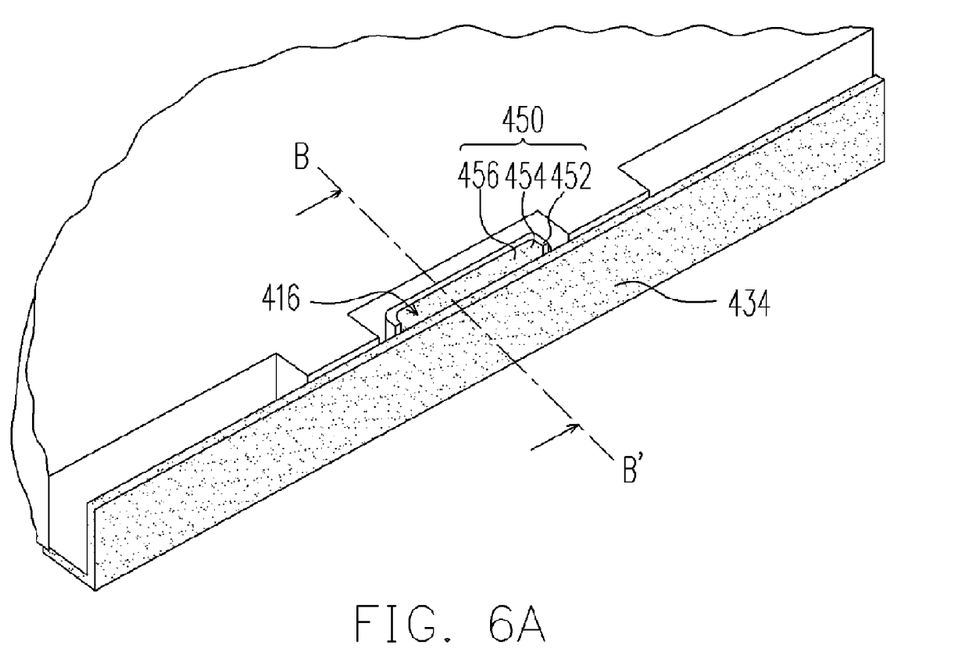
FIG. 6A is a perspective view, schematically illustrating the assembly of the positioning component, according to a third embodiment of the present invention.
Figure 6B:
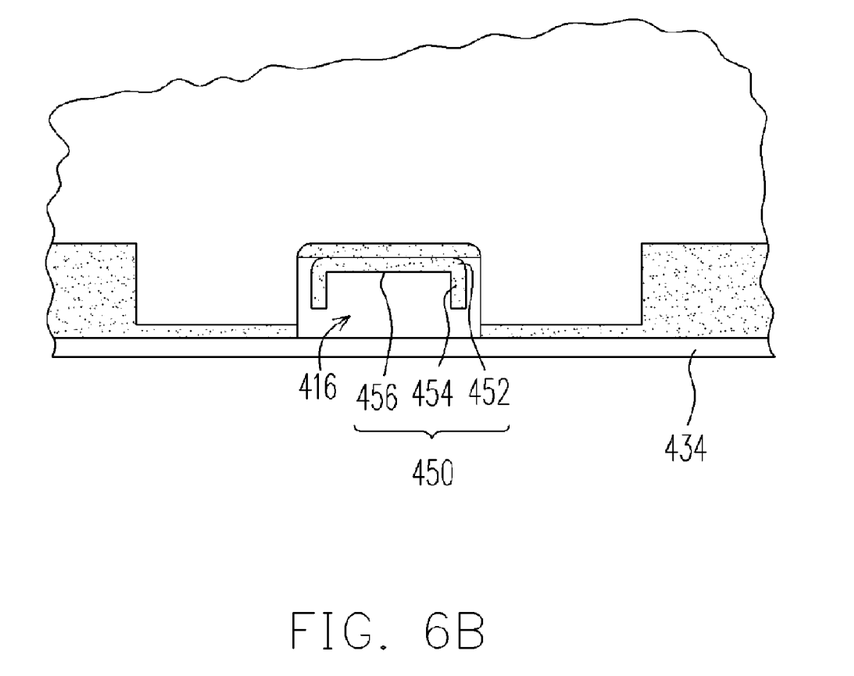
FIG. 6B is a planar view, schematically illustrating the positioning component, according to the third embodiment of the present invention.
Figure 6C:
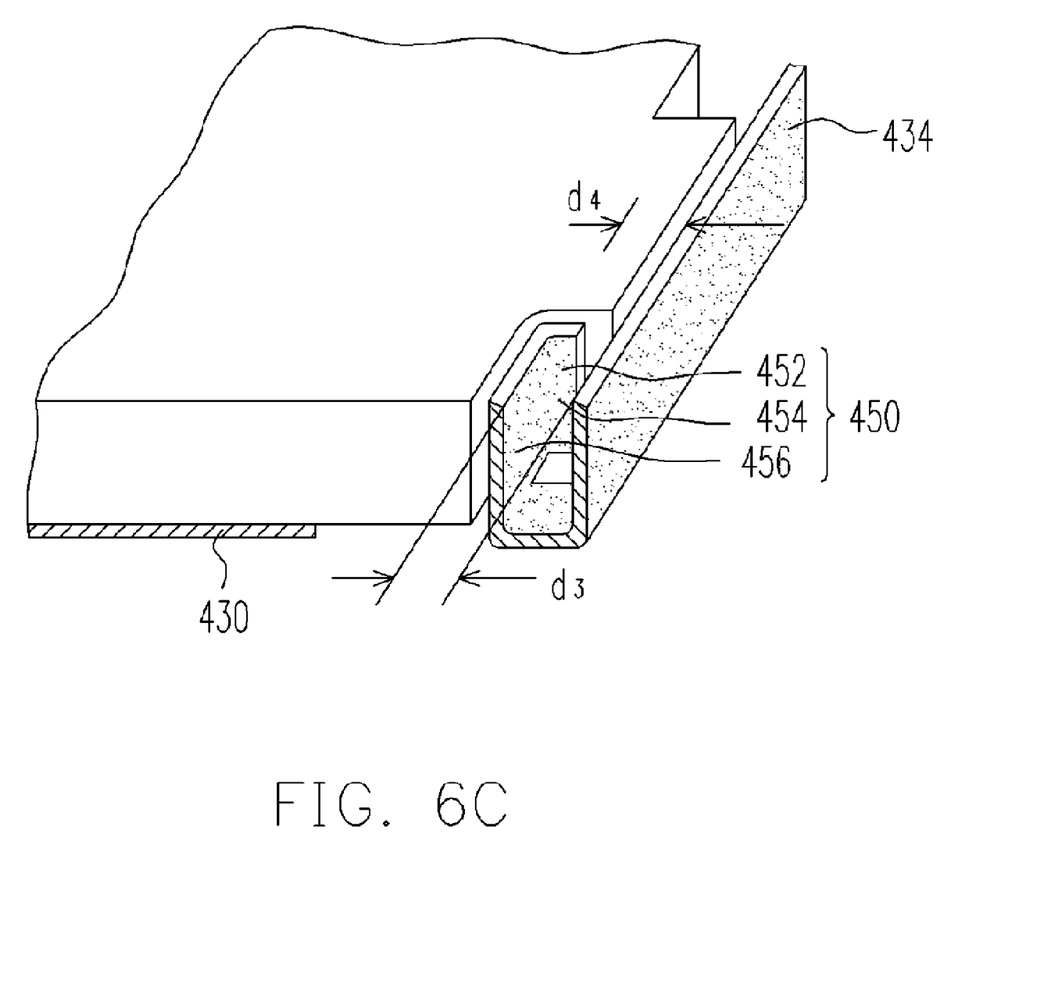
FIG. 6C is a cross-sectional view, along the line B—B in FIG. 6A.

FIGS. 6A–6B are perspective and planar views, schematically illustrating the assembly of the positioning component, according to a third embodiment of the present invention. The protrusions of this embodiment protrude from the side wall 452 and are covered by the outer wall 434. Preferably, the out wall 434 is formed by bending an edge of the back plate 430. FIG. 6C is a cross-sectional view, along the line B—B in FIG. 6A. In FIGS. 6A–6C of this embodiment, the positioning groove 416 and the positioning component 450 are covered by the outer wall 434. In addition, it can be seen from FIG. 6C that the positioning component 450 is formed by cutting a region of the back plate 430, and thereby bending the region. The side walls 452 are formed by bending the edges of the positioning component 450 and the transition walls 454 are formed automatically during forming the side walls 452. In FIG. 6C, it can be noted that there are a third separate distance d3 between the inner wall 456 and the outer wall 434 and a fourth separate distance d4 between the side wall 452 and the outer 434.

In the second and the third embodiments, the positioning component 350 or 450 is mainly formed by the inner wall 256 or 456, the side wall 352 or 452 and the transition wall 354 or 454. With a similar function as the positioning component 250 in the first embodiment, the descriptions of the positioning components 350 and 450 are omitted.

In the optical element of the present invention, since a fillet conjunction area between the protrusion and the main body is a round area, according to the analysis result from mechanical analysis software, during the impact or shock test on the back light module, the maximum stress is about ⅓ of the conventional back light module Consequently, the optical element can be prevented effectively from cracking caused by stress concentration during the impact or shock test.

In summary from above-described, the back light module of the present invention has the round corner at the conjunction region between each protrusion and the main body, and all transition walls of the positional components are near to the round corner. Due to the round corner design, the optical element can be prevented effectively from cracking caused by stress concentration during the impact or shock test, and then the quality of the liquid crystal display can be enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A back light module, comprising:
    an optical element including a main body and a plurality of protrusions protruding out from an edge of the main body, the adjacent protrusions and the main body forming a positioning groove, and a fillet between each of the protrusions and the main body;
    a light source adjacent to the optical element; and
    an outer supporting means fixing the optical element and the light source, and including a plurality of positioning components each including an inner wall adjacent to the edge of the main body, a side wall adjacent to one of the protrusions, a transition wall coupled between the side wall and the inner wall, and a separation distance g existing between the fillet and the transition wall.

2. The back light module of claim 1, wherein the outer supporting means comprises:
    a back plate supporting the optical element and the light source; and
    a front frame fixing the optical element and the light source onto the back plate.

3. The back light module of claim 2, wherein one of the positioning components is formed by cutting a region of the back plate, and thereafter bending the region.

4. The back light module of claim 2, wherein a thickness r of the back plate plus the separate distance g equals a curvature radius R of the fillet.

5. The back light module of claim 4, wherein the curvature radius R is about 0.5–1.5 mm.

6. The back light module of claim 4, wherein the thickness r is 0.3–1.0 mm.

7. The back light module of claim 4, wherein the separate distance g is 0.2–0.5 mm.

8. The back light module of claim 2, wherein the back plate includes an outer wall near to the protrusions.

9. The back light module of claim 8, wherein the outer wall is formed by bending an edge of the back plate.

10. The back light module of claim 8, wherein the protrusions protrudes from the outer wall.

11. The back light module of claim 8, wherein the protrusions protrudes from the side wall.

12. The back light module of claim 8, wherein the side wall is in conjunction with the outer wall.

13. The back light module of claim 8, wherein a third separate distance d3 is formed between the inner wall and the outer wall.

14. The back light module of claim 8, wherein a fourth separate distance d4 is formed between the side wall and the outer wall.

15. The back light module of claim 1, wherein a first separate distance d1 formed between the side wall and one side of the protrusions near to the side wall is about 0.1–0.3 mm.

16. The back light module of claim 1, wherein a second separate distance d2 formed between the main body and the inner wall is about 0.2–0.5 mm.

17. The back light module of claim 1, wherein the protrusions are rectangle or trapezoid.

18. The back light module of claim 1, wherein an included angle between the inner wall and the side wall takes a right angle or an obtuse angle.

19. The back light module of claim 1, wherein the optical element is a light guide plate or a diffusion sheet.

20. The back light module of claim 1, wherein the optical light source is a cold cathode fluorescent lamp or a light emitting diode.

* * * * *